(12) United States Patent
Van Assche et al.

(10) Patent No.: US 10,545,678 B2
(45) Date of Patent: Jan. 28, 2020

(54) SHARED DATA STORAGE SYSTEM WITH HIGH AVAILABILITY AND HOT PLUGGING

(71) Applicant: SanDisk Technologies LLC, Plano, TX (US)

(72) Inventors: Bart Joris A. Van Assche, San Jose, CA (US); Mark Ruijter, Heerhugowaard (NL)

(73) Assignee: SanDisk Technologies LLC, Plano, TX (US)

( * ) Notice: Subject to any disclaimer, the term of this patent is extended or adjusted under 35 U.S.C. 154(b) by 0 days.

(21) Appl. No.: 15/491,915

(22) Filed: Apr. 19, 2017

(65) Prior Publication Data

US 2018/0181321 A1    Jun. 28, 2018

Related U.S. Application Data

(60) Provisional application No. 62/439,883, filed on Dec. 28, 2016.

(51) Int. Cl.
*G06F 13/00* (2006.01)
*G06F 3/06* (2006.01)
*G06F 13/40* (2006.01)

(52) U.S. Cl.
CPC .......... *G06F 3/0617* (2013.01); *G06F 3/0658* (2013.01); *G06F 13/4081* (2013.01)

(58) Field of Classification Search
CPC combination set(s) only.
See application file for complete search history.

(56) References Cited

U.S. PATENT DOCUMENTS

| | | | |
|---|---|---|---|
| 8,819,317 B1* | 8/2014 | Li-On ................. | G06F 11/2221 710/74 |
| 2009/0210639 A1* | 8/2009 | Mimatsu ............... | G06F 3/0607 711/156 |
| 2010/0030929 A1* | 2/2010 | Ben-Yacov .......... | G06F 13/385 710/33 |

(Continued)

OTHER PUBLICATIONS

International Search Report and Written Opinion dated Nov. 22, 2017 received in International Patent Application No. PCT/US2017/050194, which corresponds to U.S. Appl. No. 15/491,915, 14 pages (Van Assche).

*Primary Examiner* — Henry Tsai
*Assistant Examiner* — Dean Phan
(74) *Attorney, Agent, or Firm* — Morgan, Lewis & Bockius LLP (57) ABSTRACT

A shared storage system includes a plurality of storage processors. A first storage processor of the plurality of storage processors is coupled with a shared storage device having a plurality of storage devices. The first storage processor receives a first verify connectivity request from an initiator device. In response to the first verify connectivity request, the first storage processor transmits a first ready response to the initiator device. After transmitting the first ready response, the first storage processor detects that the first storage processor is decoupled from the shared storage device. In accordance with detecting that the first storage processor is decoupled from the shared storage device, the first storage processor transmits a not-ready response to the initiator device in response to a second verify connectivity request from the initiator device.

20 Claims, 5 Drawing Sheets

(56) References Cited

U.S. PATENT DOCUMENTS

2011/0283116 A1* 11/2011 Ban ..................... G06F 3/0625
　　　　　　　　　　　　　　　　　　　　713/300
2012/0124312 A1　　5/2012　Vemuri et al.
2016/0110270 A1　　4/2016　Iwashita
2016/0179637 A1　　6/2016　Winokur
2016/0217049 A1　　7/2016　Bali et al.

* cited by examiner

SHARED DATA STORAGE SYSTEM WITH HIGH AVAILABILITY AND HOT PLUGGING

RELATED APPLICATIONS

This application claims priority to U.S. Provisional Patent Application No. 62/439,883, filed Dec. 28, 2016, which is hereby incorporated by reference in its entirety.

TECHNICAL FIELD

The disclosed embodiments relate generally to shared storage systems, such as non-volatile memory systems, and in particular to improved communications within shared storage systems through high availability and hot plugging support.

BACKGROUND

Shared storage systems typically utilize one or more storage processors for managing memory operations performed on shared storage devices, such as memory operations requested by a client system. In a shared storage system that uses a single storage processor for managing a shared storage device, unreliable connectivity of the single storage processor disrupts the operation of the shared storage system. Using multiple storage processors for managing the shared storage device improves connectivity but reduces communications speed and efficiency. Therefore, it would be desirable to have a system and method that improves both connectivity and communications between components of a shared storage system, for more robust operation of the shared storage system.

SUMMARY

Various embodiments of systems, methods and devices within the scope of the appended claims each have several aspects, no single one of which is solely responsible for the attributes described herein. Without limiting the scope of the appended claims, after considering this disclosure, and particularly after considering the section entitled "Detailed Description," one will understand how the aspects of various embodiments are used to enable high availability and hot plugging in shared storage systems.

The disclosed device and method enable improved connectivity and communications within shared storage systems, such as non-volatile memory systems. In response to a first verify connectivity request from an initiator device, a first storage processor transmits a first ready response to the initiator device. After transmitting the first ready response, and, in accordance with detecting that it (the first storage processor) is decoupled from the shared storage device, the first storage processor transmits a not-ready response to the initiator device in response to a second verify connectivity request from the initiator device.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate the more pertinent features of the present disclosure and are therefore not to be considered limiting, for the description may admit to other effective features.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The various implementations described herein include systems, methods and/or devices used to enable high availability and hot plugging in shared storage systems. Some implementations include systems, methods and/or devices to improve connectivity and communications within shared storage systems.

(A1) More specifically, some embodiments include a method of operation in a shared storage system. In some embodiments, the method is performed at a first storage processor of a plurality of storage processors of the shared storage system. The first storage processor is coupled with a shared storage device having a plurality of storage devices. The method includes receiving a first verify connectivity request from an initiator device and transmitting a first ready response to the initiator device in response to the first verify connectivity request. The method also includes, after transmitting the first ready response, detecting that the first storage processor is decoupled from the shared storage device, and, in accordance with detecting that the first storage processor is decoupled from the shared storage device, transmitting a not-ready response to the initiator device in response to a second verify connectivity request from the initiator device.

(A2) In some embodiments of the method of A1, the first verify connectivity request is a test-unit-ready request.

(A3) In some embodiments, the method of any of A1-A2 further includes, at the first storage processor, after transmitting the not-ready response, detecting that the first storage processor is recoupled with the shared storage device, and, in accordance with detecting that the first storage processor is recoupled with the shared storage device, transmitting a second ready response to the initiator device in response to a third verify connectivity request from the initiator device.

(A4) In some embodiments of the method of any of A1-A3, in accordance with the first storage processor transmitting the not-ready response to the initiator device, the initiator device transmits a third verify connectivity request to a second storage processor of the plurality of storage processors of the shared storage system. The second storage processor is coupled with the shared storage device. In these embodiments, the method further includes, at the second storage processor, receiving the third verify connectivity request from the initiator device, transmitting a second ready response to the initiator device in response to the third verify connectivity request, and, after transmitting the second ready response to the initiator device, in accordance with a read request received from the initiator device, performing a read operation to read data from the shared storage device and transmitting the data read from the shared storage device to the initiator device.

(A5) In some embodiments, the method of any of A1-A4 includes, at the first storage processor, after transmitting the first ready response to the initiator device, and before detecting that the first storage processor is decoupled from the shared storage device, in accordance with a read request received from the initiator device, performing a read operation to read data from the shared storage device and transmitting the data read from the shared storage device to the initiator device.

(A6) In some embodiments of the method of any of A1-A5, responses to verify connectivity requests received at the first storage processor are determined by the first storage processor in accordance with a test-unit-ready parameter stored by the first storage processor.

(A7) In some embodiments, the method of A6 includes, at the first storage processor, setting the test-unit-ready parameter to a not-ready value in accordance with detecting that the first storage processor is decoupled from the shared storage device.

(A8) In some embodiments of the method of any of A1-A7, communications between the plurality of storage processors and the shared storage device use small computer system interface (SCSI) commands.

(A9) In some embodiments of the method of any of A1-A8, verify connectivity requests from the initiator device to the first storage processor are received in accordance with an indication that the first storage processor is a preferred storage processor.

(A10) In some embodiments of the method of any of A1-A9, the shared storage device comprises a non-volatile memory device.

(A11) In some embodiments of the method of any of A1-A10, the shared storage device comprises a flash memory device.

(A12) In another aspect, a shared storage system includes a plurality of storage processors. A first storage processor of the plurality of storage processors is coupled with a shared storage device having a plurality of storage devices. The first storage processor is configured to receive a first verify connectivity request from an initiator device, and transmit a first ready response to the initiator device in response to the first verify connectivity request. In addition, the first storage processor is configured to, after transmitting the first ready response, detect that the first storage processor is decoupled from the shared storage device, and, in accordance with detecting that the first storage processor is decoupled from the shared storage device, transmit a not-ready response to the initiator device in response to a second verify connectivity request from the initiator device.

(A13) In some embodiments of the shared storage system of A12, the first verify connectivity request is a test-unit-ready request.

(A14) In some embodiments of the shared storage system of any of A12-A13, the first storage processor is configured to, after transmitting the not-ready response, detect that the first storage processor is recoupled with the shared storage device, and, in accordance with detecting that the first storage processor is recoupled with the shared storage device, transmit a second ready response to the initiator device in response to a third verify connectivity request from the initiator device.

(A15) In some embodiments of the shared storage system of any of A12-A14, in accordance with the first storage processor transmitting the not-ready response to the initiator device, the initiator device transmits a third verify connectivity request to a second storage processor of the plurality of storage processors of the shared storage system. In some embodiments, the second storage processor is coupled with the shared storage device, and the second storage processor is configured to receive the third verify connectivity request from the initiator device, transmit a second ready response to the initiator device in response to the third verify connectivity request, and, after transmitting the second ready response to the initiator device, in accordance with a read request received from the initiator device, perform a read operation to read data from the shared storage device and transmit the data read from the shared storage device to the initiator device.

(A16) In some embodiments of the shared storage system of any of A12-A15, the first storage processor is configured to, after transmitting the first ready response to the initiator device, and before detecting that the first storage processor is decoupled from the shared storage device, in accordance with a read request received from the initiator device, perform a read operation to read data from the shared storage device and transmit the data read from the shared storage device to the initiator device.

(A17) In some embodiments of the shared storage system of any of A12-A16, responses to verify connectivity requests received at the first storage processor are determined by the first storage processor in accordance with a test-unit-ready parameter stored by the first storage processor.

(A18) In some embodiments of the shared storage system of A17, the first storage processor is configured to set the test-unit-ready parameter to a not-ready value in accordance with detecting that the first storage processor is decoupled from the shared storage device.

(A19) In some embodiments of the shared storage system of any of A12-A18, communications between the plurality of storage processors and the shared storage device use small computer system interface (SCSI) commands.

(A20) In some embodiments of the shared storage system of any of A12-A19, verify connectivity requests from the initiator device to the first storage processor are received in accordance with an indication that the first storage processor is a preferred storage processor.

(A21) In some embodiments of the shared storage system of any of A12-A20, the shared storage device comprises a non-volatile memory device.

(A22) In some embodiments of the shared storage system of any of A12-A21, the shared storage device comprises a flash memory device.

(A23) In yet another aspect, a non-transitory computer readable storage medium stores one or more programs configured for execution by one or more processors of a shared storage system, the one or more programs including instructions that when executed by the one or more processors cause the shared storage system to perform the method of any of A1-A11, described above.

(A24) In yet another aspect, a shared storage system includes one or more processors, memory, and one or more programs stored in the memory. The one or more programs include instructions for receiving a first verify connectivity request from an initiator device and transmitting a first ready response to the initiator device in response to the first verify connectivity request. The one or more programs further include instructions for, after transmitting the first ready response, detecting that the first storage processor is decoupled from the shared storage device, and, in accordance with detecting that the first storage processor is decoupled from the shared storage device, transmitting a not-ready response to the initiator device in response to a second verify connectivity request from the initiator device.

(A25) In some embodiments of the shared storage system of A24, the one or more processors include one or more processors of a first storage processor of a plurality of storage processors. In some embodiments, the first storage processor is coupled with a shared storage device having a plurality of storage devices. In addition, in some embodiments, the one or more programs include a client interface module configured to receive one or more verify connectivity requests from an initiator device and configured to transmit one or more responses to the initiator device, and a shared storage interface module configured to detect whether the first storage processor is decoupled from the shared storage device.

(A26) In some embodiments of the shared storage system of any of A24-A25, the one or more programs further include instructions for performing the method of any of A1-A11.

(A27) In yet another aspect, a shared storage system includes a first storage processor of a plurality of storage processors of the shared storage system. In some embodiments, the first storage processor is coupled with a shared storage device having a plurality of storage devices, and the first storage processor includes: means for receiving a first verify connectivity request from an initiator device; means for transmitting a first ready response to the initiator device in response to the first verify connectivity request; and means, enabled after transmitting the first ready response, including: means for detecting that the first storage processor is decoupled from the shared storage device; and means, enabled in accordance with detecting that the first storage processor is decoupled from the shared storage device, for transmitting a not-ready response to the initiator device in response to a second verify connectivity request from the initiator device.

(A28) In some embodiments, the shared storage system of A27 further comprises means for performing the method of any of A1-A11.

Numerous details are described herein to provide a thorough understanding of the example implementations illustrated in the accompanying drawings. However, some embodiments may be practiced without many of the specific details, and the scope of the claims is only limited by those features and aspects specifically recited in the claims. Furthermore, well-known methods, components, and circuits have not been described in exhaustive detail so as not to unnecessarily obscure more pertinent aspects of the implementations described herein.

Figure 1:
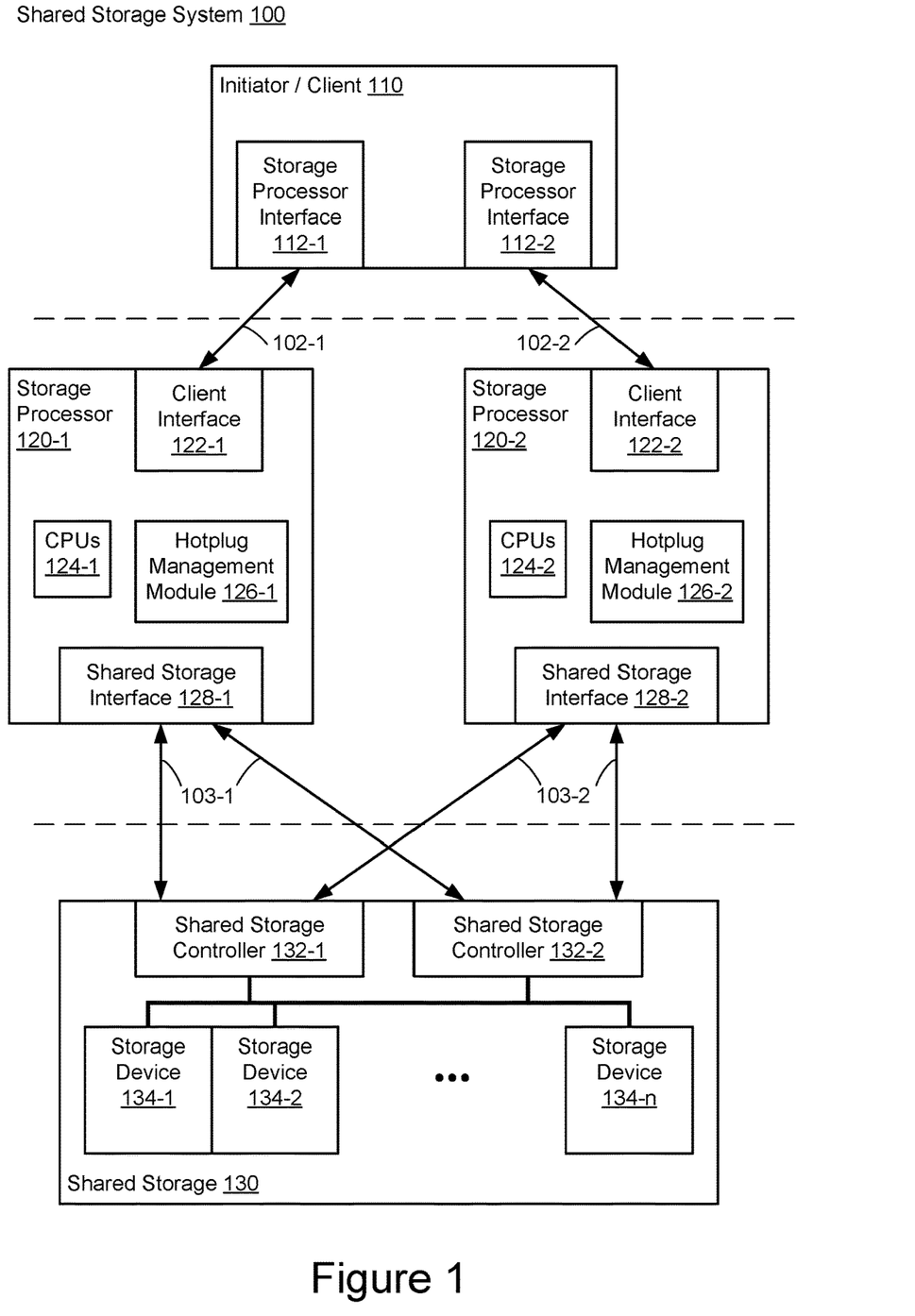
FIG. 1 is a block diagram illustrating an implementation of a shared storage system, in accordance with some embodiments.

FIG. 1A is a block diagram illustrating an implementation of shared storage system 100, in accordance with some embodiments. While some example features are illustrated, various other features have not been illustrated for the sake of brevity and so as not to obscure pertinent aspects of the example embodiments disclosed herein. To that end, as a non-limiting example, shared storage system 100 includes a plurality of storage processors, including storage processor 120-1 and storage processor 120-2. In some embodiments, the plurality of storage processors is coupled with a client system (also sometimes called a client, client device, initiator, or initiator device), such as initiator/client 110 (referred to herein as initiator 110). In some embodiments, initiator 110 includes one or more storage processor interfaces, such as storage processor interfaces 112-1 and 112-2, used for communications between initiator 110 and the plurality of storage processors 120. In some embodiments, the plurality of storage processors is coupled with a shared storage device, such as shared storage device 130. In some embodiments, shared storage device 130 includes a plurality of storage devices 134-1, 134-2 through 134-$n$, and one or more shared storage controllers, such as shared storage controllers 132-1 and 132-2, used for communications between the plurality of storage processors 120 and the plurality of storage devices 134. In some embodiments, shared storage device 130 includes one or more non-volatile memory devices (e.g., storage devices 134-1, 134-2 through 134-$n$ are non-volatile memory devices). In some embodiments, shared storage device 130 includes one or more flash memory devices (e.g., storage devices 134-1, 134-2 through 134-$n$ are flash memory devices).

In some embodiments, storage processor 120-1 includes client interface 122-1 for communicating with a client device, such as initiator 110. In some embodiments, storage processor 120-1 is coupled with initiator 110 through client interface 122-1. In some embodiments, communications between storage processor 120-1 and initiator 110 use a defined interface standard for communication, such as Small Computer Systems Interface (SCSI), Internet Small Computer Systems Interface (iSCSI), InfiniBand (IB), Fibre Channel (FC), or other storage interface.

In some embodiments, storage processor 120-1 includes shared storage interface 128-1 for communicating with a shared storage device, such as shared storage device 130. In some embodiments, storage processor 120-1 is coupled with shared storage device 130 through shared storage interface 128-1. In some embodiments, communications between storage processor 120-1 and shared storage device 130 use a defined interface standard for communication, such as Small Computer Systems Interface (SCSI), serial advance technology attachment (SATA), Serial Attached SCSI (SAS), or other storage interface.

In some embodiments, storage processor 120-1 includes hotplug management module 126-1. In some embodiments, hotplug management module 126-1 monitors connectivity between storage processor 120-1 and shared storage device 130. In some embodiments, storage processor 120-1 includes one or more processing units 124-1 (sometimes herein called CPUs, processors, or hardware processors, and sometimes implemented using microprocessors, microcontrollers, or the like) configured to execute instructions in one or more programs (e.g., in storage processor 120-1 or a component of storage processor 120 such as hotplug management module 126-1). In some embodiments, the one or more CPUs 124-1 are shared by one or more components within, and in some cases, beyond the function of storage processor 120-1. In some embodiments, CPUs 124-1 manage communications to and from storage processor 120-1 through client interface 122-1 and/or shared storage interface 128-1.

In some embodiments, storage processor 120-2 includes similar elements to those described above with reference to storage processor 120-1. Storage processors 120-1 and/or 120-2 may include various additional features that have not been illustrated for the sake of brevity and so as not to obscure pertinent features of the example embodiments disclosed herein, and a different arrangement of features may be possible.

Figure 2:
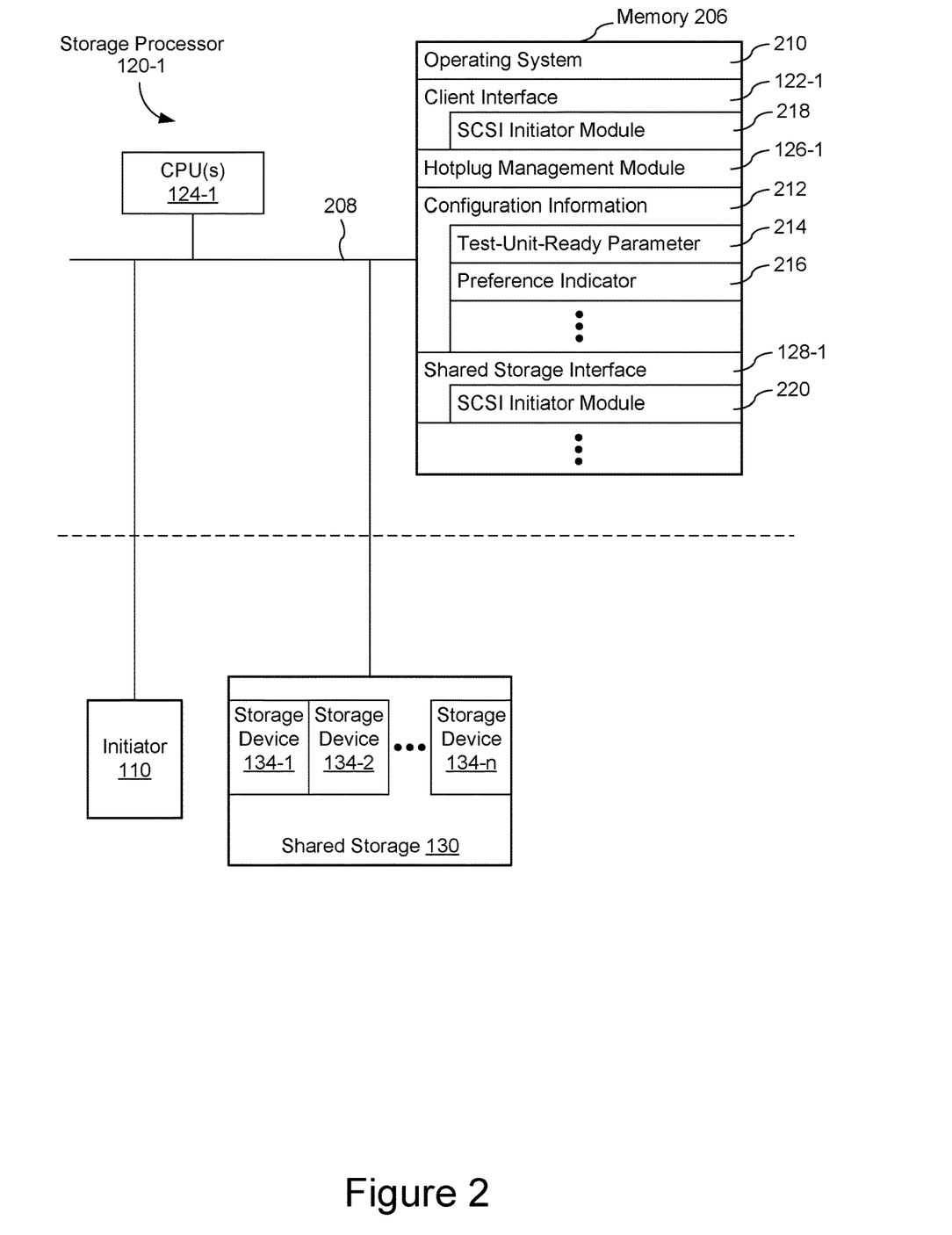
FIG. 2 is a block diagram illustrating an implementation of a storage processor of a shared storage system, in accordance with some embodiments.

FIG. 2 is a block diagram illustrating an implementation of a storage processor 120-1 or 120-2 (hereinafter storage processor 120), in accordance with some embodiments. Storage processor 120 typically includes one or more processing units 124-1 for executing modules, programs and/or instructions stored in memory 206 and thereby performing processing operations; memory 206 (sometimes herein called controller memory); and one or more communication buses 208 for interconnecting these components. Communication buses 208 optionally include circuitry (sometimes called a chipset) that interconnects and controls communications between system components. In some embodiments, such as those represented by FIG. 1, storage processor 120 is coupled with initiator 110 and shared storage device 130 via communication buses 208. It is noted that the components represented in FIG. 2 may vary depending on the configuration of a particular shared storage system, and that the representations shown in FIG. 2, configured according to FIG. 1, are merely non-limiting examples. Memory 206 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 206 optionally includes one or more storage devices remotely located from processor(s) 124-1. In some embodiments, memory 206, or alternately the non-volatile memory device(s) within memory 206, comprises a non-transitory computer readable storage medium. In some embodiments, memory 206, or the computer readable storage medium of memory 206, stores the following programs, modules, and data structures, or a subset or superset thereof:
- operating system 210 that includes procedures for handling various basic system services and for performing hardware dependent tasks;
- client interface 122-1 that is used for communicating with other components, such as initiator 110; in some embodiments, client interface 122-1 includes a SCSI target module 218, which receives requests from initiator(s) and sends responses to requests back to the initiator(s);
- hotplug management module 126-1 that is used for monitoring connectivity with other components, such as shared storage device 130;
- configuration information 212 that is used for storing information used to configure storage processor 120, and that may include:
  - test-unit-ready parameter 214 that is used for indicating a status of storage processor 120, such as whether storage processor 120 is ready to process commands from initiator 110; and
- shared storage interface 128-1 that is used for communicating with other components, such as shared storage device 130; in some embodiments, shared storage interface 128-1 includes a SCSI initiator module 220, which manages communications with shared storage device 130.

Each of the above identified elements may be stored in one or more of the previously mentioned memory devices that together form memory 206, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above. In some embodiments, the programs, modules, and data structures stored in memory 206, or the computer readable storage medium of memory 206, provide instructions for implementing respective operations in the methods described below with reference to FIGS. 3A-3B and 4.

Although FIG. 2 shows storage processor 120-1, FIG. 2 is intended more as a functional description of the various features that may be present in a storage processor than as a structural schematic of the embodiments described herein. In practice, and as recognized by those of ordinary skill in the art, items shown separately could be combined and some items could be separated. Further, as noted above, in some embodiments, one or more modules of storage processor 120-1 are implemented in storage processor 120-1 or storage processor 120-2 of shared storage system 100, FIG. 1.

Figure 3A:
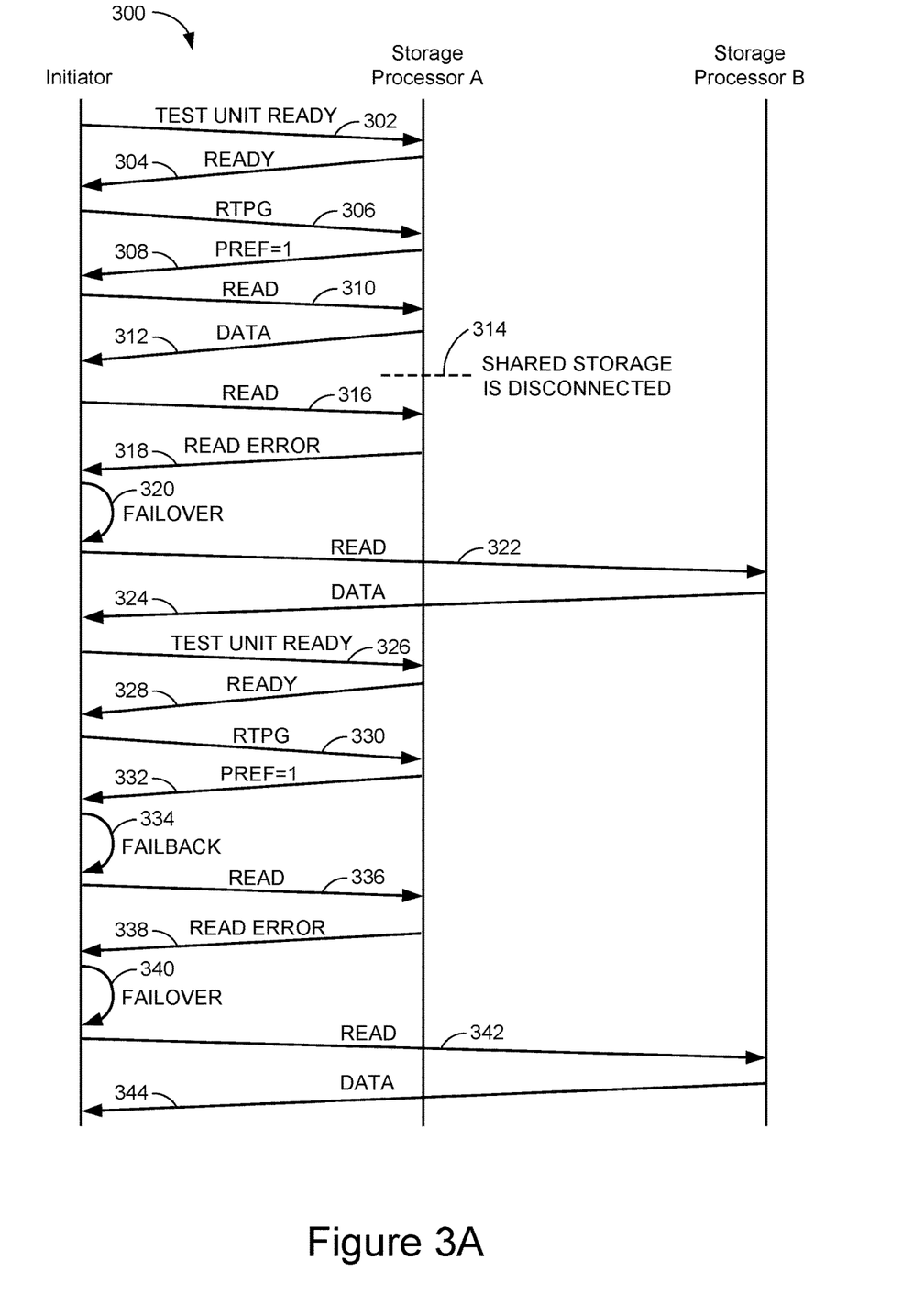
FIG. 3A illustrates an example flowchart representation of a method of communications in a shared storage system without hot plugging support, in accordance with some embodiments.

FIG. 3A illustrates an example flowchart representation of a method 300 of communications in a shared storage system without hot plugging support, in accordance with some embodiments. For ease of explanation, the following describes method 300 as performed by a first storage processor A (e.g., storage processor 120-1, FIG. 1), a second storage processor B (e.g., storage processor 120-2, FIG. 1), and an initiator (e.g., initiator 110, FIG. 1) that is operatively coupled with storage processor A and storage processor B, where communications between the storage processors and the initiator use small computer systems interface (SCSI) commands. The method begins with storage processor A (e.g., storage processor 120-1, FIG. 1) and storage processor B (e.g., storage processor 120-2) both connected to a shared storage device (e.g., shared storage device 130, FIG. 1), where communications between the storage processors and the shared storage device also use SCSI commands.

Storage processor A receives (302) a test-unit-ready (TUR) request from the initiator. In response to the test-unit-ready request, storage processor A transmits (304) a ready response to the initiator.

After transmitting the ready response (304), storage processor A receives (306) a Report Target Port Groups (RTPG) request from the initiator. In response, storage processor A transmits (308) a Preference Indicator (PREF) bit having a value set to '1', indicating that storage processor A is a preferred storage processor for accessing the shared storage device.

After transmitting the indication that it is a preferred storage processor, storage processor A receives (310) a read request from the initiator to read data from the shared storage device. In response, storage processor A reads data from the shared storage device and transmits (312) the data read from the shared storage device to the initiator.

Next, storage processor A is (314) disconnected from the shared storage device, such that storage processor A loses communication with the shared storage device.

While storage processor A is disconnected from the shared storage device, in response to a subsequent read request from the initiator to read data from the shared storage device (316), storage processor A transmits (318) a read error, as storage processor A is unable to communicate with the shared storage device to read the requested data.

In response to the read error from storage processor A, the initiator performs (320) a failover operation, switching to storage processor B instead of storage processor A for accessing the shared storage device. Accordingly, the initiator transmits (322) a read request to storage processor B. In response, storage processor B reads data from the shared storage device and transmits (324) the data read from the shared storage device to the initiator.

Subsequently, the initiator transmits (326) a second TUR request to storage processor A. In response, storage processor A transmits (328) a ready response to the initiator, even though storage processor A is still disconnected from the shared storage device. Accordingly, the initiator transmits (330) a second RTPG request to storage processor A and, in response, storage processor A (re)transmits the PREF bit with a value set to '1', indicating that storage processor A is the preferred storage processor.

In accordance with storage processor A transmitting a ready response and the PREF bit indicating that storage processor A is the preferred storage processor, the initiator performs (334) a failback operation, switching back to storage processor A for accessing the shared storage device. Accordingly, the initiator transmits (336) a read request to storage processor A. However, because storage processor A is still disconnected from the shared storage device and unable to communicate with the shared storage device to read the requested data, storage processor A again transmits (338) a read error.

In response to the read error from storage processor A, the initiator again performs (340) a failover operation, switching to storage processor B instead for accessing the shared storage device, and accordingly transmits (342) a read request to storage processor B. In response, storage processor B reads data from the shared storage device and transmits (344) the data read from the shared storage device to the initiator.

Figure 3B:
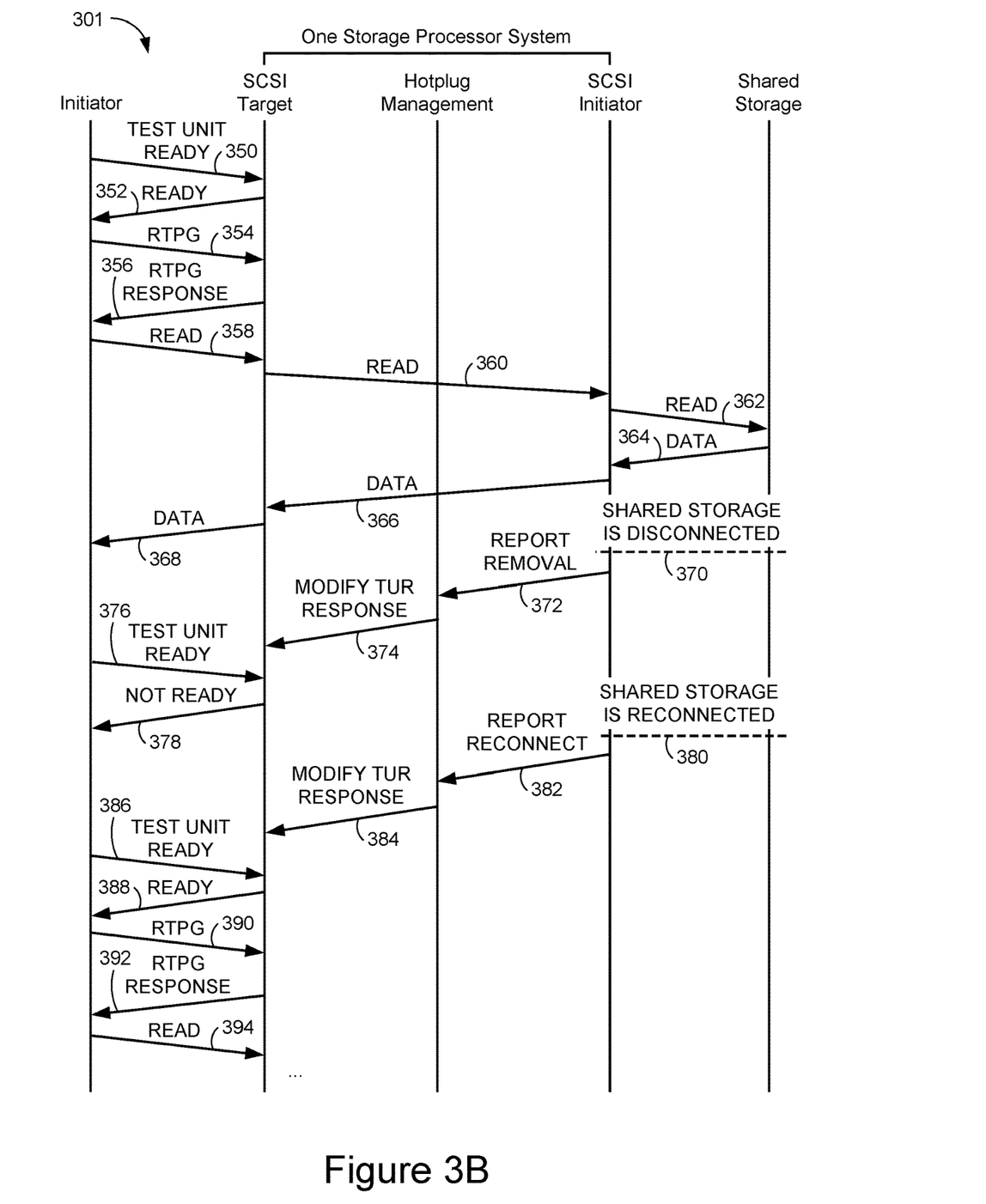
FIG. 3B illustrates an example flowchart representation of a method of improved communications in a shared storage system, in accordance with some embodiments.

FIG. 3B illustrates an example flowchart representation of a method 301 of improved communications in a shared storage system, in accordance with some embodiments. With reference to the shared storage system pictured in FIG. 1, in some embodiments, some of the operations (or alternatively, steps) of method 301 are performed, at least in part, at a storage processor (e.g., storage processor 120-1, FIG. 1) or one or more components of the storage processor (e.g., client interface 122-1, hotplug management module 126-1, and/or shared storage interface 128-1, FIG. 1). In some embodiments, method 301 is governed by instructions that are stored in a non-transitory computer readable storage medium and that are executed by one or more processors of a device, such as the one or more processing units (CPUs) 124-1 of storage processor 120-1 (FIG. 1).

In some embodiments, some of the operations of method 301 are performed at an initiator (e.g., initiator 110, FIG. 1) that is operatively coupled with the storage processor and/or at a shared storage device (e.g., shared storage device 130, FIG. 1) that is operatively coupled with the storage processor, and other operations of method 301 are performed at the storage processor. In some of these embodiments, method 301 is governed, at least in part, by instructions that are stored in a non-transitory computer readable storage medium and that are executed by one or more processors (e.g., hardware processors) of the initiator and/or shared storage device, respectively.

With reference to FIG. 2, in some embodiments, some of the operations of method 301 are performed, at least in part, by a hotplug management module (e.g., hotplug management module 126-1, FIG. 2), and using, in some instances, a client interface (e.g., client interface 122-1, FIG. 2) and a shared storage interface (e.g., shared storage interface 128-1, FIG. 2) of the storage processor.

For ease of explanation, the following describes method 301 as performed at a particular storage processor (e.g., storage processor 120-1, FIG. 1) and an initiator (e.g., initiator 110, FIG. 1) that is operatively coupled with the storage processor. In the example shown in FIG. 3B, communications between the storage processor 120-1 and the initiator 110 use small computer systems interface (SCSI) commands. Accordingly, the storage processor is coupled with the initiator through a SCSI target module 218 (or, more generally, a client interface, such as client interface 122-1, FIG. 1) at the storage processor 120 that is used for communications with the initiator (e.g., the storage processor 230 is a SCSI target with respect to the initiator 110). In some embodiments, the initiator 110 similarly includes an interface (e.g., storage processor interface 112-1, FIG. 1) that is used for communications with the storage processor 120. It should be understood that method 310 is also performed at the other storage processor(s) of the shared storage system when requests are directed by the initiator to those other storage processors. In some embodiments, other communication protocols, different from the ones described here, are used when performing method 301.

Method 301 begins with the storage processor (e.g., storage processor 120-1, FIG. 1) also operatively coupled with a shared storage device (e.g., shared storage device 130, FIG. 1). In the example shown in FIG. 3B, the storage processor is coupled with the shared storage device through a SCSI initiator module (or, more generally, a shared storage interface, such as shared storage interface 128-1, FIG. 1) at the storage processor that is used for communications with the shared storage device (e.g., the storage processor is a SCSI initiator with respect to the shared storage device), where communications between the storage processor and the shared storage device also use SCSI commands. In addition, the storage processor includes a hotplug management module for managing connectivity (e.g., between the storage processor and the shared storage device). In some embodiments, the shared storage device similarly includes an interface (e.g., shared storage controller 132-1, FIG. 1) that is used for communications with the storage processor.

The storage processor (e.g., the SCSI target module 218) receives (350) a test-unit-ready (TUR) request from the initiator 110. In response to the test-unit-ready request, the storage processor transmits (352) a ready response to the initiator (e.g., to indicate that the storage processor is available to process commands from the initiator for accessing data stored in the shared storage device). In some embodiments, the storage processor (or a component of the storage processor, such as the SCSI target module 218) stores configuration information (e.g., configuration information 212, FIG. 2) that includes a test-unit-ready parameter (e.g., test-unit-ready parameter 214, FIG. 2). In some embodiments, the test-unit-ready parameter indicates whether the storage processor is in a ready state (e.g., coupled with the shared storage device) or a not-ready state (e.g., decoupled from the shared storage device). In some embodiments, the test-unit-ready parameter is updated in accordance with determining whether the storage processor is coupled with the shared storage device (e.g., the test-unit ready parameter is set or updated to a ready value in accordance with detecting that the storage processor is or has become coupled with the shared storage device, and the test-unit ready parameter is set or updated to a not-ready value in accordance with detecting that the storage processor is or has become decoupled from the shared storage device). In some embodiments, the storage processor determines responses to test-unit-ready requests from the initiator in accordance with the test-unit-ready parameter stored in the storage processor.

After (or in response to) transmitting the ready response (352), in some embodiments, the storage processor receives (354) a Report Target Port Groups (RTPG) request from the initiator. In response to the RTPG request from the initiator, the storage processor transmits (356) an RTPG response. In some embodiments, the RTPG response transmitted by the storage processor includes a Preference Indicator (PREF) bit having a value set to '1', indicating that the storage processor is a preferred storage processor for accessing data stored in the shared storage device.

After transmitting the RTPG response (e.g., indicating that it is a preferred storage processor), the storage processor (e.g., the SCSI target module) receives (358) a read request from the initiator to read data from the shared storage device (e.g., the request is received before the storage processor detects that it is disconnected from the shared storage device). In some embodiments, the read request from the initiator is received by the SCSI target module of the storage processor, and the read request is transmitted (360) to the SCSI initiator module 220, or shared storage interface 128-1, which are used for communications with the shared storage device. In response (and while the storage processor is connected to the shared storage device), the storage processor performs (362) a read operation to read data from the shared storage device (e.g., the storage processor uses the SCSI initiator module 220 to read data from the shared storage device). The storage processor (e.g., the SCSI initiator module 220) receives (364) the data read from the shared storage device and transmits (e.g., using the SCSI target module 218 (366)) the data to the initiator (368).

Next, the storage processor (370) is disconnected from the shared storage device (e.g., such that the storage processor loses communication with the shared storage device). The storage processor detects that the shared storage device is disconnected (e.g., the shared storage device is removed). For example, the SCSI initiator module 220 detects that the shared storage is disconnected and reports (372) the disconnection to the hotplug management module 126-1. In response, the hotplug management module modifies (374) the storage processor's response to test-unit-ready requests. In some embodiments, the hotplug management module sets or updates the test-unit-ready parameter (e.g., test-unit-ready parameter 214, stored in configuration information 212, FIG. 2) to indicate that the storage processor is in a not-ready state.

While the storage processor is disconnected from the shared storage device, in response to a subsequent test-unit-ready request from the initiator (376), the storage processor transmits (378) a not-ready response (e.g., in accordance with the test-unit-ready parameter having been set to a not-ready value by the storage processor in response to detecting the disconnection from the shared storage device, as discussed above with reference to operation 374).

In accordance with the storage processor transmitting the not-ready response, the initiator is notified that the storage processor is unavailable to process commands from the initiator (e.g., requests to perform memory operations, such as read and/or write commands) for accessing the shared storage device. In some embodiments, the initiator does not subsequently transmit an RTPG request. In some embodiments, in response to receiving the not-ready response from the (first) storage processor, the initiator switches to a second storage processor (e.g., storage processor 120-2, FIG. 1, or storage processor B, FIG. 3A) for accessing the shared storage device, as described herein in further detail with reference to FIG. 4.

Next, the (first) storage processor is (380) reconnected to the shared storage device (e.g., restoring communications between the storage processor and the shared storage device). The storage processor detects that the shared storage device is reconnected. For example, the SCSI initiator module 220 detects that the shared storage is reconnected and reports (382) the reconnection to the hotplug management module 126-1. In response, the hotplug management module modifies (384) the storage processor's response to (subsequently received) test-unit-ready requests. In some embodiments, the hotplug management module updates the test-unit-ready parameter (e.g., test-unit-ready parameter 214, stored in configuration information 212, FIG. 2) to indicate that the storage processor is (again) in a ready state.

After the storage processor is reconnected to the shared storage device, in response to a subsequent test-unit-ready request from the initiator (386), the storage processor transmits (388) a ready response (e.g., in accordance with the test-unit-ready parameter having been updated by the storage processor in response to detecting the reconnection to the shared storage device, as discussed above with reference to operation 384).

After transmitting the ready response (388), the storage processor receives (390) an RTPG request from the initiator. In response to the RTPG request from the initiator, the storage processor transmits (392) an RTPG response, which in some embodiments includes the PREF bit having a value set to '1', indicating that the storage processor is a preferred storage processor for accessing the shared storage device. In some embodiments, the PREF bit is independent of whether the storage processor is connected to a shared storage device (e.g., the value of the PREF bit is maintained regardless of whether the storage processor is connected to or disconnected from a shared storage device).

After transmitting the RTPG response (e.g., indicating that it is a preferred storage processor), the storage processor receives (394) a read request from the initiator to read data from the shared storage device. In some embodiments, in response to the read request, method 301 proceeds as described above with reference to operations 360, 362, 364, 366, and 368. For brevity, these details are neither illustrated nor repeated here.

Figure 4:
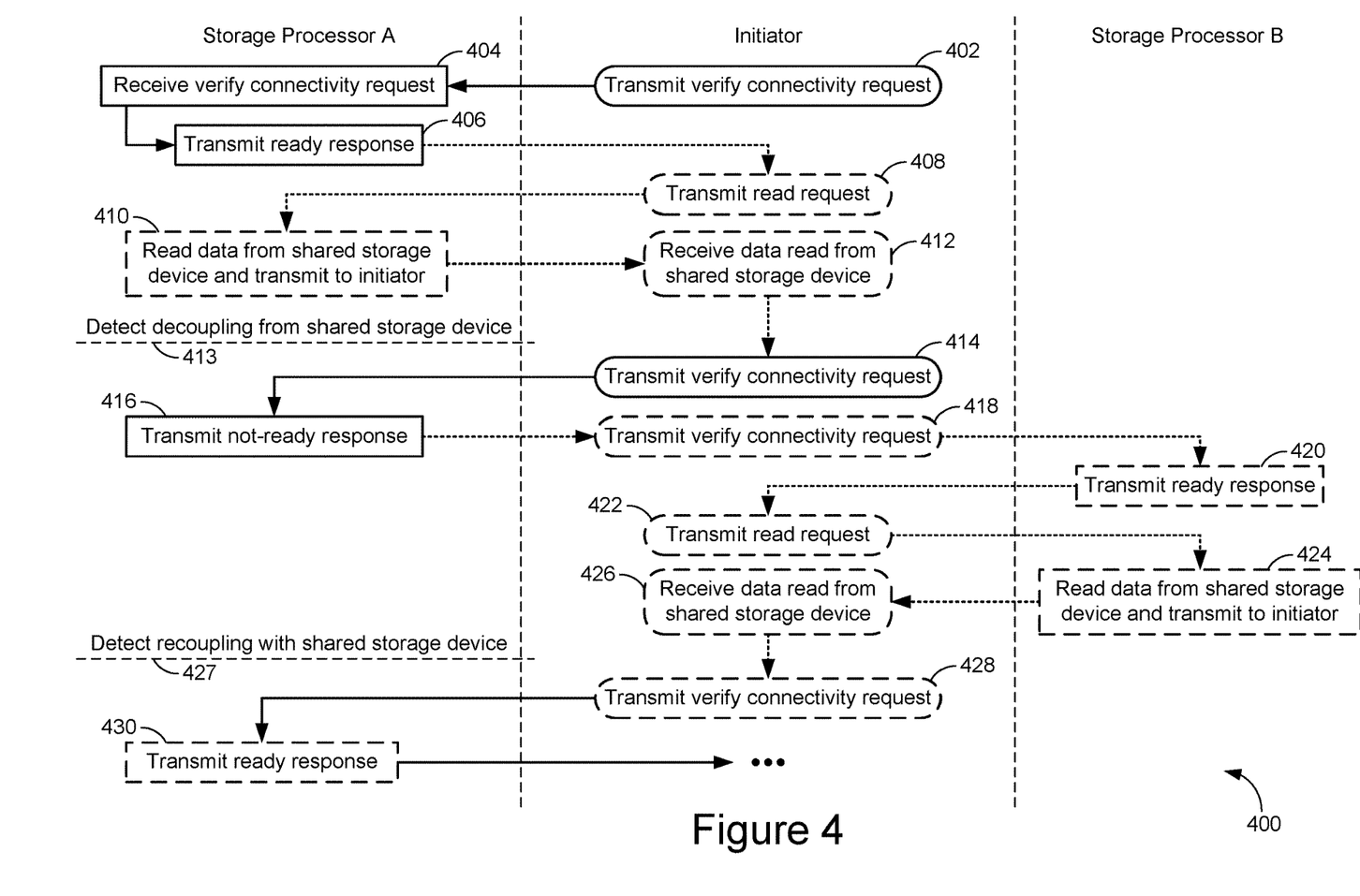
FIG. 4 illustrates a conceptual flowchart representation of a method of improved communications in a shared storage system, in accordance with some embodiments.

FIG. 4 illustrates a conceptual flowchart representation of a method 400 of improved communications in a shared storage system, in accordance with some embodiments. With reference to the shared storage system pictured in FIG. 1, in some embodiments, some of the operations (or alternatively, steps) of method 400 are performed, at least in part, at a first storage processor (e.g., storage processor 120-1, FIG. 1) or one or more components of the first storage processor (e.g., client interface 122-1, hotplug management module 126-1, and/or shared storage interface 128-1, FIG. 1). In some embodiments, method 400 is governed by instructions that are stored in a non-transitory computer readable storage medium and that are executed by one or more processors of a device, such as the one or more processing units (CPUs) 124-1 of storage processor 120-1 (FIG. 1). In some embodiments, some of the operations of method 400 are performed, at least in part, at a second storage processor (e.g., storage processor 120-2, FIG. 1) or one or more components of the second storage processor (e.g., client interface 122-2, hotplug management module 126-2, and/or shared storage interface 128-2, FIG. 1). In some embodiments, method 400 is governed by instructions that are stored in a non-transitory computer readable storage medium and that are executed by one or more processors of a device, such as the one or more processing units (CPUs) 124-2 of storage processor 120-2 (FIG. 1).

In some embodiments, some of the operations of method 400 are performed at an initiator (e.g., initiator 110, FIG. 1) that is operatively coupled with the first and second storage processors and/or at a shared storage device (e.g., shared storage device 130, FIG. 1) that is operatively coupled with the first and second storage processors, and other operations of method 301 are performed at a respective storage processor. In some of these embodiments, method 400 is governed, at least in part, by instructions that are stored in a non-transitory computer readable storage medium and that are executed by one or more processors (e.g., hardware processors) of the initiator and/or shared storage device, respectively.

With reference to FIG. 2, in some embodiments, some of the operations of method 400 are performed, at least in part, by a hotplug management module (e.g., hotplug management module 126-1, FIG. 2), and using, in some instances, a client interface (e.g., client interface 122-1, FIG. 2) and a shared storage interface (e.g., shared storage interface 128-1, FIG. 2) of a respective storage processor.

For ease of explanation, the following describes method 400 as performed at an initiator (e.g., initiator 110, FIG. 1) and a plurality of storage processors, including a first storage processor A (e.g., storage processor 120-1, FIG. 1) and a second storage processor B (e.g., storage processor 120-2, FIG. 1). The method begins with storage processor A (e.g., storage processor 120-1, FIG. 1) coupled with (e.g., connected to) a shared storage device (e.g., shared storage device 130, FIG. 1). In some embodiments, communications between the plurality of storage processors and the shared storage device use small computer system interface (SCSI) commands (e.g., as described above with reference to method 301, FIG. 3B). The initiator transmits (402) a (first) verify connectivity request (e.g., a test-unit-ready request, such as a test-unit-ready request that is in accordance with SCSI standards) to storage processor A. Storage processor A receives (404) the verify connectivity request. In response to the verify connectivity request and, in some embodiments, in accordance with a determination that storage processor A is in a ready state, storage processor A transmits (406) a ready response to the initiator (e.g., to indicate that storage processor A is available to process commands from the initiator for accessing data stored in the shared storage device).

In some embodiments, storage processor A stores configuration information (e.g., configuration information 212, FIG. 2) that includes a test-unit-ready parameter (e.g., test-unit-ready parameter 214, FIG. 2). As described above with reference to operation 352 of method 301 (FIG. 3B), in some embodiments, the test-unit-ready parameter indicates whether the storage processor is in a ready state or a not-ready state, and the test-unit-ready parameter is updated in accordance with determining whether the storage processor is coupled with the shared storage device. In some embodiments, storage processor A determines responses to verify connectivity requests (e.g., test-unit-ready requests) from the initiator in accordance with the test-unit-ready parameter stored in storage processor A.

In some embodiments, after transmitting the ready response to the initiator (406), storage processor A receives a request from the initiator for additional configuration information. In some embodiments, in response to the request for additional configuration information, storage processor A transmits an indication that it (storage processor A) is a preferred storage processor (e.g., a preferred storage processor for accessing data stored in the shared storage device). For example, in some embodiments, in accordance with SCSI standards, storage processor A stores configuration information (e.g., configuration information 212, FIG. 2) that includes a preference indicator (e.g., preference indicator 216, FIG. 2) indicating whether storage processor A is a preferred storage processor (e.g., the preference indicator is a bit, where a bit value of '1' indicates that the storage processor is a preferred storage processor, while a bit value of '0' indicates that the storage processor is not a preferred storage processor). In some embodiments, storage processor A receives a Report Target Port Groups (RTPG) request from the initiator, and, in response, transmits a Preference Indicator (PREF) bit having a value set to '1', indicating that storage processor A is a preferred storage processor (e.g., in accordance with preference indicator 216, FIG. 2).

In some embodiments, after storage processor A transmits (406) the ready response to the initiator (and, in some embodiments, after storage processor A receives a request from the initiator for additional configuration information and responds to the request), the initiator transmits (408) a read request to storage processor A to read data from the shared storage device (or, more generally, the initiator transmits a command or request to storage processor A to perform a memory operation on the shared storage device). In some embodiments, if storage processor A receives the read request from the initiator while storage processor A is still coupled with the shared storage device (and thus before detecting that storage processor A is decoupled from the shared storage device), storage processor A reads (410) the data from the shared storage device and transmits the data read to the initiator in response to the read request (or, more generally, storage processor A performs the requested memory operation). The initiator, in turn, receives (412) the data transmitted by storage processor A.

In some embodiments, or in some circumstances, storage processor A detects (413) that it is decoupled (e.g., disconnected) from the shared storage device (e.g., as described in more detail above with reference to operations 370, 372, and 374 of method 301, FIG. 3B).

In some embodiments, while storage processor A is decoupled from the shared storage device, the initiator transmits (414) a second verify connectivity request (e.g., a second test-unit-ready request). In response, storage processor A transmits (416) a not-ready response (e.g., in accordance with storage processor A detecting that it is disconnected from the shared storage device, indicating that storage processor A is not available to process commands from the initiator for accessing data stored in the shared storage device).

In some embodiments, in response to receiving the not-ready response from storage processor A, the initiator switches to a second storage processor B for accessing the shared storage device. In some embodiments, the initiator transmits (418) a third verify connectivity request (e.g., a third test-unit-ready request) to storage processor B. In some embodiments, the initiator periodically transmits verify connectivity requests to (e.g., polls) one or more of the plurality of storage processors to determine whether a respective storage processor is in a ready state (e.g., available to process commands from the initiator for accessing data stored in the shared storage device). For example, in some embodiments, the initiator periodically transmits verify connectivity requests to storage processor B (or both storage processor A and storage processor B) independent of whether storage processor A is in a ready state. In some embodiments (e.g., in accordance with a determination that storage processor B is coupled to the shared storage device), storage processor B transmits (420) a ready response to the initiator in response to the third verify connectivity request (e.g., storage processor B is available to process commands from the initiator for accessing data stored in the shared storage device).

In some embodiments, in response to receiving the not-ready response from storage processor A (416) (and, in some embodiments, in response to receiving the ready response from storage processor B (420)), the initiator transmits (422) a read request to storage processor B to read data from the shared storage device. In response, storage processor B reads (424) the data from the shared storage device and transmits the data read to the initiator. The initiator, in turn, receives (426) the data transmitted by storage processor B.

In some embodiments, or in some circumstances, storage processor A detects (427) that it is recoupled with (e.g., reconnected to) the shared storage device (e.g., as described in more detail above with reference to operations 380, 382, and 384 of method 301, FIG. 3B).

In some embodiments, after storage processor A is recoupled with the shared storage device, the initiator transmits (428) a fourth verify connectivity request to storage processor A, and in response storage processor A transits (430) a ready response to the initiator (e.g., to indicate that storage processor A is available to process commands from the initiator for accessing data stored in the shared storage device). In some embodiments, storage processor A receives verify connectivity requests from the initiator in accordance with an indication that storage processor A is a preferred storage processor (e.g., as described in further detail above with reference to operations 354, 356, 390, and 392 of method 301, FIG. 3B). In some embodiments, in accordance with the indication that storage processor A is a preferred storage processor, after the initiator switches to storage processor B (e.g., in accordance with the not-ready response from storage processor A) and requests storage processor B to perform one or more memory operations on the shared storage device, the initiator switches back to storage processor A before requesting performance of any subsequent memory operation(s) on the shared storage device.

It is noted that method 301 of FIG. 3B and method 400 of FIG. 4 obviate the failback and failover operations described herein with reference to method 300 of FIG. 3A, thereby improving speed and efficiency of communications between the plurality of storage processors, initiator, and shared storage device, within a shared storage system, and increases robustness of the shared storage system.

It will be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the "second contact" are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific implementations. However, the illustrative discussions above are not intended to be exhaustive or to limit the claims to the precise forms disclosed. Many modifications and variations are possible in view of the above teachings. The implementations were chosen and described in order to best explain principles of operation and practical applications, to thereby enable others skilled in the art.

What is claimed is:

1. A method, comprising:
   at a first storage processor of a plurality of storage processors of a shared storage system, wherein the first storage processor is coupled with a shared storage device having a plurality of storage devices, the shared storage device being shared between the first storage processor and a second storage processor of the plurality of storage processors:
   receiving a first verify connectivity request from an initiator device;
   transmitting a first ready response to the initiator device in response to the first verify connectivity request; and
   after transmitting the first ready response:
      detecting that the first storage processor is decoupled from the shared storage device; and
      in accordance with detecting that the first storage processor is decoupled from the shared storage device, updating a first parameter to indicate that the first storage processor is decoupled from the shared storage device;
   after updating the first parameter:
      receiving a second verify connectivity request from the initiator device; and
      transmitting a not-ready response to the initiator device in response to the second verify connectivity request from the initiator device and in accordance with the updated first parameter.

2. The method of claim 1, wherein the first verify connectivity request is a test-unit-ready request.

3. The method of claim 1, further comprising:
   at the first storage processor, after transmitting the not-ready response:

detecting that the first storage processor is recoupled with the shared storage device; and in accordance with detecting that the first storage processor is recoupled with the shared storage device, transmitting a second ready response to the initiator device in response to a third verify connectivity request from the initiator device.

4. The method of claim 1, wherein, in accordance with the first storage processor transmitting the not-ready response to the initiator device, the initiator device transmits a third verify connectivity request to the second storage processor of the plurality of storage processors of the shared storage system, wherein the second storage processor is coupled with the shared storage device, the method further comprising:

at the second storage processor:
receiving the third verify connectivity request from the initiator device;
transmitting a second ready response to the initiator device in response to the third verify connectivity request; and
after transmitting the second ready response to the initiator device, in accordance with a read request received from the initiator device, performing a read operation to read data from the shared storage device and transmitting the data read from the shared storage device to the initiator device.

5. The method of claim 1, further comprising:
at the first storage processor, after transmitting the first ready response to the initiator device, and before detecting that the first storage processor is decoupled from the shared storage device:
in accordance with a read request received from the initiator device, performing a read operation to read data from the shared storage device and transmitting the data read from the shared storage device to the initiator device.

6. The method of claim 1, wherein responses to verify connectivity requests received at the first storage processor are determined by the first storage processor in accordance with a test-unit-ready parameter stored by the first storage processor.

7. The method of claim 6, further comprising, at the first storage processor, setting the test-unit-ready parameter to a not-ready value in accordance with detecting that the first storage processor is decoupled from the shared storage device.

8. The method of claim 1, wherein communications between the plurality of storage processors and the shared storage device use small computer system interface (SCSI) commands.

9. The method of claim 1, wherein verify connectivity requests from the initiator device to the first storage processor are received in accordance with an indication that the first storage processor is a preferred storage processor.

10. The method of claim 1, wherein the shared storage device comprises a non-volatile memory device.

11. The method of claim 1, wherein the shared storage device comprises a flash memory device.

12. A shared storage system, comprising:
a plurality of storage processors, wherein a first storage processor of the plurality of storage processors is coupled with a shared storage device having a plurality of storage devices, and wherein the first storage processor is configured to:
receive a first verify connectivity request from an initiator device;
transmit a first ready response to the initiator device in response to the first verify connectivity request; and
after transmitting the first ready response:
detect that the first storage processor is decoupled from the shared storage device; and
in accordance with detecting that the first storage processor is decoupled from the shared storage device, update a first parameter to indicate that the first storage processor is decoupled from the shared storage device;
after updating the first parameter:
receive a second verify connectivity request from the initiator device; and
transmit a not-ready response to the initiator device in response to the second verify connectivity request from the initiator device and in accordance with the updated first parameter; and
a second storage processor coupled with the shared storage device, the second storage processor being configured to share the shared storage device with the first storage processor.

13. The shared storage system of claim 12, wherein the first verify connectivity request is a test-unit-ready request.

14. The shared storage system of claim 12, wherein the first storage processor is further configured to:
after transmitting the not-ready response:
detect that the first storage processor is recoupled with the shared storage device; and
in accordance with detecting that the first storage processor is recoupled with the shared storage device, transmit a second ready response to the initiator device in response to a third verify connectivity request from the initiator device.

15. The shared storage system of claim 12, wherein:
in accordance with the first storage processor transmitting the not-ready response to the initiator device, the initiator device transmits a third verify connectivity request to the second storage processor of the plurality of storage processors of the shared storage system, wherein the second storage processor is coupled with the shared storage device, and
wherein the second storage processor is configured to:
receive the third verify connectivity request from the initiator device;
transmit a second ready response to the initiator device in response to the third verify connectivity request; and
after transmitting the second ready response to the initiator device, in accordance with a read request received from the initiator device, perform a read operation to read data from the shared storage device and transmit the data read from the shared storage device to the initiator device.

16. The shared storage system of claim 12, wherein the first storage processor is further configured to:
after transmitting the first ready response to the initiator device, and before detecting that the first storage processor is decoupled from the shared storage device:
in accordance with a read request received from the initiator device, perform a read operation to read data from the shared storage device and transmit the data read from the shared storage device to the initiator device.

17. The shared storage system of claim 12, wherein responses to verify connectivity requests received at the first storage processor are determined by the first storage processor in accordance with a test-unit-ready parameter stored by the first storage processor.

18. A shared storage system, comprising:
one or more processors;
memory; and
one or more programs stored in the memory, the one or more programs including instructions for:
  receiving a first verify connectivity request from an initiator device;
  transmitting a first ready response to the initiator device in response to the first verify connectivity request; and
  after transmitting the first ready response:
    detecting that the first storage processor is decoupled from the shared storage device; and
    in accordance with detecting that the first storage processor is decoupled from the shared storage device, updating a first parameter to indicate that the first storage processor is decoupled from the shared storage device;
  after updating the first parameter:
    receiving a second verify connectivity request from the initiator device; and
    transmitting a not-ready response to the initiator device in response to the second verify connectivity request from the initiator device and in accordance with the updated first parameter.

19. The shared storage system of claim 18, wherein:
the one or more processors include one or more processors of the first storage processor of a plurality of storage processors;
the first storage processor is coupled with the shared storage device, the shared storage device having a plurality of storage devices; and
the one or more programs include:
  a client interface module configured to: receive one or more verify connectivity requests from an initiator device and configured to transmit one or more responses to the initiator device; and
  a shared storage interface module configured to detect whether the first storage processor is decoupled from the shared storage device.

20. A shared storage system, comprising:
a first storage processor of a plurality of storage processors of the shared storage system, wherein the first storage processor is coupled with a shared storage device having a plurality of storage devices, the shared storage device being shared between the first storage processor and a second storage processor of the plurality of storage processors, and wherein the first storage processor includes:
means for receiving a first verify connectivity request from an initiator device;
means for transmitting a first ready response to the initiator device in response to the first verify connectivity request; and
means, enabled after transmitting the first ready response, including:
  means for detecting that the first storage processor is decoupled from the shared storage device; and
  means, enabled in accordance with detecting that the first storage processor is decoupled from the shared storage device, for updating a first parameter to indicate that the first storage processor is decoupled from the shared storage device;
means, enabled after updating the first parameter:
  means for receiving a second verify connectivity request from the initiator device; and
  means for transmitting a not-ready response to the initiator device in response to the second verify connectivity request from the initiator device and in accordance with the updated first parameter.

* * * * *